(12) United States Patent
Jo et al.

(10) Patent No.: US 7,922,357 B2
(45) Date of Patent: Apr. 12, 2011

(54) EXTERNAL LIGHT SHIELDING LAYER, FILTER FOR DISPLAY APPARATUS AND DISPLAY APPARATUS HAVING THE SAME

(75) Inventors: Sung Nim Jo, Seoul (KR); Sang Cheol Jung, Suwon-si (KR); Eun Young Cho, Seoul (KR)

(73) Assignee: Samsung Corning Precision Materials Co., Ltd., Gyeongsangbuk-Do (KR)

( * ) Notice: Subject to any disclaimer, the term of this patent is extended or adjusted under 35 U.S.C. 154(b) by 454 days.

(21) Appl. No.: 11/987,183

(22) Filed: Nov. 28, 2007

(65) Prior Publication Data
US 2008/0151555 A1 Jun. 26, 2008

(30) Foreign Application Priority Data
Dec. 21, 2006 (KR) .................. 10-2006-0132228

(51) Int. Cl.
*F21V 9/00* (2006.01)
(52) U.S. Cl. ...... 362/293; 362/97.1; 362/97.2; 362/561; 362/627; 349/104
(58) Field of Classification Search ........ 362/97.1–97.4, 362/293, 561, 627; 349/58, 104–107
See application file for complete search history.

(56) References Cited

U.S. PATENT DOCUMENTS
| | | | | |
|---|---|---|---|---|
| 5,481,385 A | * | 1/1996 | Zimmerman et al. | 349/62 |
| 2006/0044826 A1 | * | 3/2006 | Marra et al. | 362/602 |
| 2006/0103779 A1 | * | 5/2006 | Amemiya et al. | 349/95 |
| 2007/0152555 A1 | * | 7/2007 | Park et al. | 313/112 |
| 2007/0247731 A1 | * | 10/2007 | Mizusako | 359/872 |

FOREIGN PATENT DOCUMENTS
| | | |
|---|---|---|
| JP | 2006-084876 | 3/2006 |
| KR | 10-0579713 B1 | 5/2006 |
| KR | 10-2006-0080116 A | 7/2006 |

OTHER PUBLICATIONS

Korean Office Action issued in Korean Patent Application No. KR 10-2006-0132228 dated Nov. 16, 2009.
Korean Office Action issued in Korean Patent Application No. 10-2006-0132228, mailed Mar. 8, 2010.

* cited by examiner

*Primary Examiner* — Sandra L O Shea
*Assistant Examiner* — Meghan K Dunwiddie
(74) *Attorney, Agent, or Firm* — McDermott Will & Emery LLP (57) ABSTRACT

Disclosed are an external light-shielding layer for a display filter preventing occurrence of ghosting using a difference between refractive indexes of a base substrate and an external light-shielding part, and a display filter and display apparatus including the external light-shielding layer. The external light-shielding layer for the display filter comprises a base substrate made of a transparent resin; and at least one external light-shielding part arranged on a surface of the base substrate and filled with an external light-absorption material, wherein $n_y$ of a refractive index of the base substrate is less than or equal to $n_x$ of a refractive index of the external light-shielding part.

14 Claims, 5 Drawing Sheets

FIG. 4B

EXTERNAL LIGHT SHIELDING LAYER, FILTER FOR DISPLAY APPARATUS AND DISPLAY APPARATUS HAVING THE SAME

CROSS-REFERENCE TO RELATED APPLICATION

This application claims the benefit of Korean Patent Application No. 10-2006-0132228, filed on Dec. 21, 2006, in the Korean Intellectual Property Office, the disclosure of which is incorporated herein by reference.

BACKGROUND OF THE INVENTION

1. Field of the Invention

The present invention relates to a filter for a display apparatus and a display apparatus having the same, and more particularly, to a filter for a display apparatus and a display apparatus having the same, which includes an external light-shielding layer preventing occurrence of ghosting using a difference between refractive indexes of a base substrate and an external light-shielding part.

2. Description of Related Art

A PDP apparatus generates a gas discharge between electrodes by a direct current (DC) voltage or an alternating current (AC) voltage which are supplied to electrodes. Here, ultraviolet light is generated. Then, a phosphor is exited by ultraviolet light, thereby emitting light.

However, the PDP apparatus has a defect in that an amount of emitted electromagnetic (EM) radiation and near infrared (NI) radiation with respect to a driving characteristic is great, surface reflectivity of the phosphor is great, and color purity due to orange light emitted from helium (He), or xenon (Xe) used as a sealing gas is lower than the CRT.

Also, EM radiation and NI radiation generated in the PDP apparatus may have harmful effects on human bodies, and cause sensitive equipment such as wireless telephones, remote controls, and the like, to malfunction. Therefore, in order to use the PDP apparatus, it is required to prevent emission of EM radiation and NI radiation emitted from the PDP apparatus from increasing to more than a predetermined level. PDP filters having functions such as an EM radiation-shielding function, an NI radiation-shielding function, a surface antiglare function, enhancement of color purity function, and the like, are used for EM radiation-shielding and NI radiation-shielding while simultaneously reducing reflected light, and enhancing color purity.

The PDP apparatus is made of a panel assembly including a discharge space where a gas discharge phenomenon occurs, and a PDP filter for EM radiation-shielding and NI radiation-shielding. Since the PDP filter is equipped in a front unit of the panel assembly, transparency is required to simultaneously emit light and perform shielding functions.

External light may enter the panel assembly passing through the PDP filter in a condition that an outer surface is bright, that is, in a bright room condition with the PDP apparatus according to the conventional art. Accordingly, an overlapping between incident light generated in the discharge space of the panel assembly, and the external light entered passing through the PDP filter from the outer surface occurs. Accordingly, a contrast ratio decreases in the bright room condition, and therefore screen display capacity of the PDP apparatus is deteriorated. Therefore, there is a need for a PDP filter including an external light-shielding layer filled with an absorption material to absorb external light.

In a conventional external light-shielding layer for improving contrast ratio, in order to minimize loss of a display light source and at the same time shield external light, the external light-shielding layer is designed such that a refractive index of an external light-shielding part is less than that of a base substrate of the external light-shielding layer, so that a part of light emitted from a display is totally reflected and transmitted, and thus, remarkably reducing loss of the light emitted from the display using the external light-shielding part.

However, in the conventional art, in order to improve transmittance of the light emitted from the display, a refractive index of the external light-shielding part must be reduced to 0.01 or less than that of the base substrate. However, there arises a problem in that an image is distorted due to occurrence of ghosting by a difference between reflective indexes of the light emitted from the display and the light totally reflected and transmitted.

SUMMARY OF THE INVENTION

An aspect of the present invention provides an external light-shielding layer for a display filter in which a refractive index of a base substrate is less than that of an external light-shielding part so that total reflection of light emitted from a display is prevented, thereby preventing occurrence of ghosting, and a display filter and display apparatus including the external light-shielding layer.

An aspect of the present invention provides an external light-shielding layer for a display filter which prevents lowering of picture quality caused by external light while preventing lowering brightness of an image display, and a display filter and display apparatus including the external light-shielding layer.

An aspect of the present invention also provides a filter for a display apparatus in which brightness and a contrast ratio in a bright room condition are improved by improving a structure of a PDP filter.

An aspect of the present invention also provides a display apparatus including the display filter as described above.

According to an aspect of the present invention, there is provided an external light-shielding layer comprising a base substrate made of a transparent resin; and at least one external light-shielding part arranged on a surface of the base substrate and filled with an external light-absorption material, wherein $n_y$ of a refractive index of the base substrate is less than or equal to $n_x$ of a refractive index of the external light-shielding part.

According to another aspect of the present invention, there is provided a filter for a display apparatus comprising a filter base; and an external light-shielding layer formed on a surface of the filter base, and including a base substrate made of a transparent resin and at least one external light-shielding part arranged on a surface of the base substrate, wherein $n_y$ of a refractive index of the base substrate is less than or equal to $n_x$ of a refractive index of the external light-shielding part.

In this instance, the display apparatus according to the present invention is any one of a large-sized display apparatus corresponding to one selected from among a Plasma Display Panel (PDP) apparatus, an Organic Light Emitting Diode (OLED) apparatus, a Liquid Crystal Display (LCD) apparatus, and a Field Emission Display (FED) apparatus, a small-sized mobile display apparatus corresponding to any one of a display window of a small-sized game device and a display window of a mobile phone, and a flexible display apparatus. In particular, the display apparatus according to the present invention may be effectively applied to a display apparatus for outdoor use where external light is relatively strong and a display apparatus installed in indoor public facilities. For convenience of description, exemplary embodiments of the present invention will be described hereinafter by using a PDP apparatus and a PDP filter for the PDP apparatus, but the embodiments are not limited thereto. The present invention may be applied to various kinds of display apparatuses and the filters for the display apparatus as described above.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
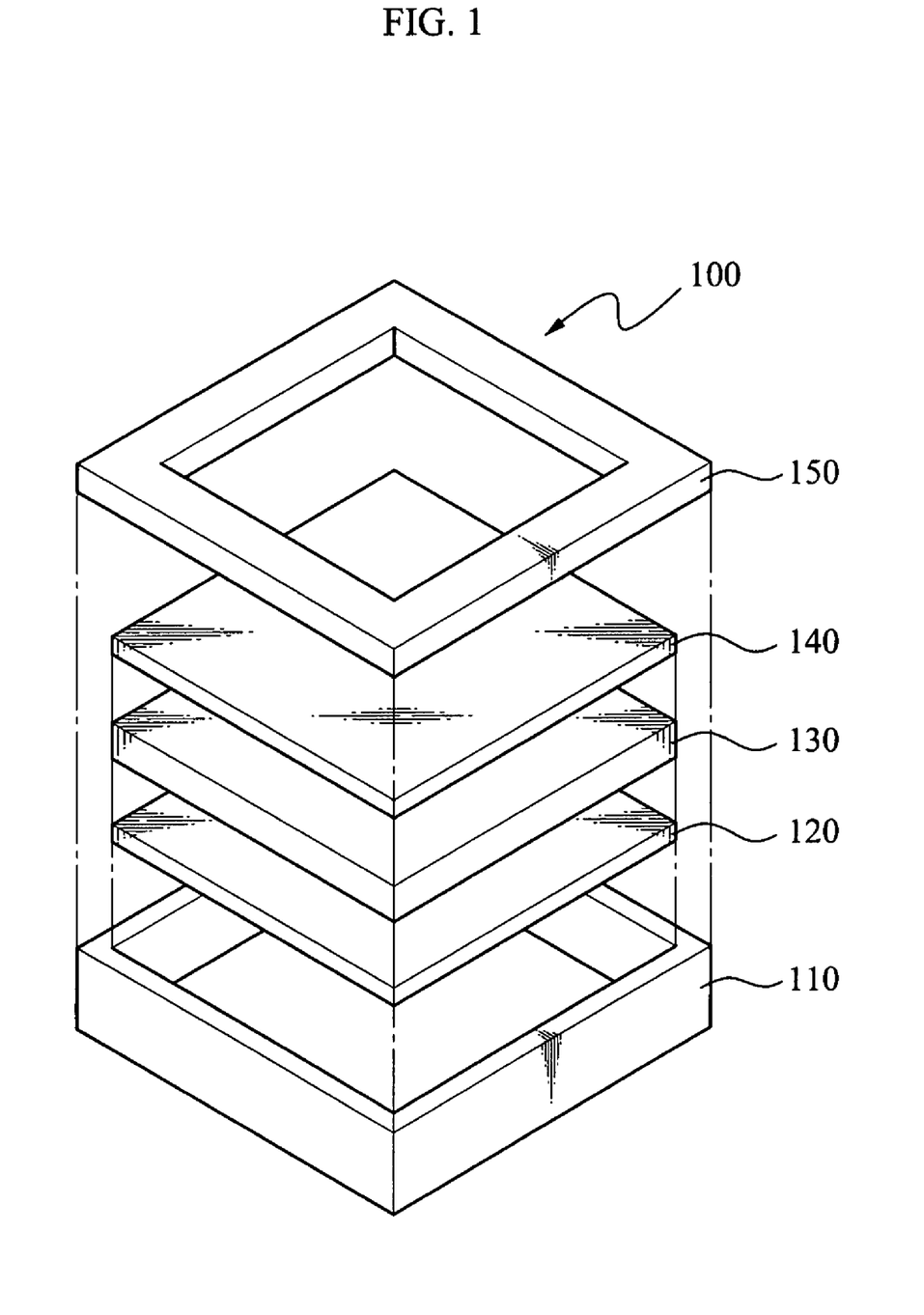
FIG. 1 is an exploded perspective view illustrating a Plasma Display Panel (PDP) apparatus according to an exemplary embodiment of the invention.

FIG. 1 is an exploded perspective view illustrating a Plasma Display Panel (PDP) apparatus according to an exemplary embodiment of the invention.

A structure of the PDP apparatus 100 according to the exemplary embodiment of the present invention includes a case 110, a cover 150 covering an upper part of the case 110, a driving circuit board 120 received in the case 110, a panel assembly 130 including a discharge space where a gas discharge phenomenon occurs, and a PDP filter 140, as illustrated in FIG. 1. The PDP filter 140 includes a conductive layer including a material with high conductivity on a transparent substrate, and the conductive layer is grounded to the case 110 via the cover 150. Specifically, electromagnetic (EM) radiation generated from the panel assembly 130 is shielded by the cover 150 and the case 110 which are grounded using the conductive layer of the PDP filter 140, before reaching a viewer.

First, the PDP filter 140 for shielding EM radiation, near infrared ray, external light, and the like will be described in detail, and then the PDP apparatus including the PDP filter 140 and the panel assembly 130 will be described in detail.

Figure 2:
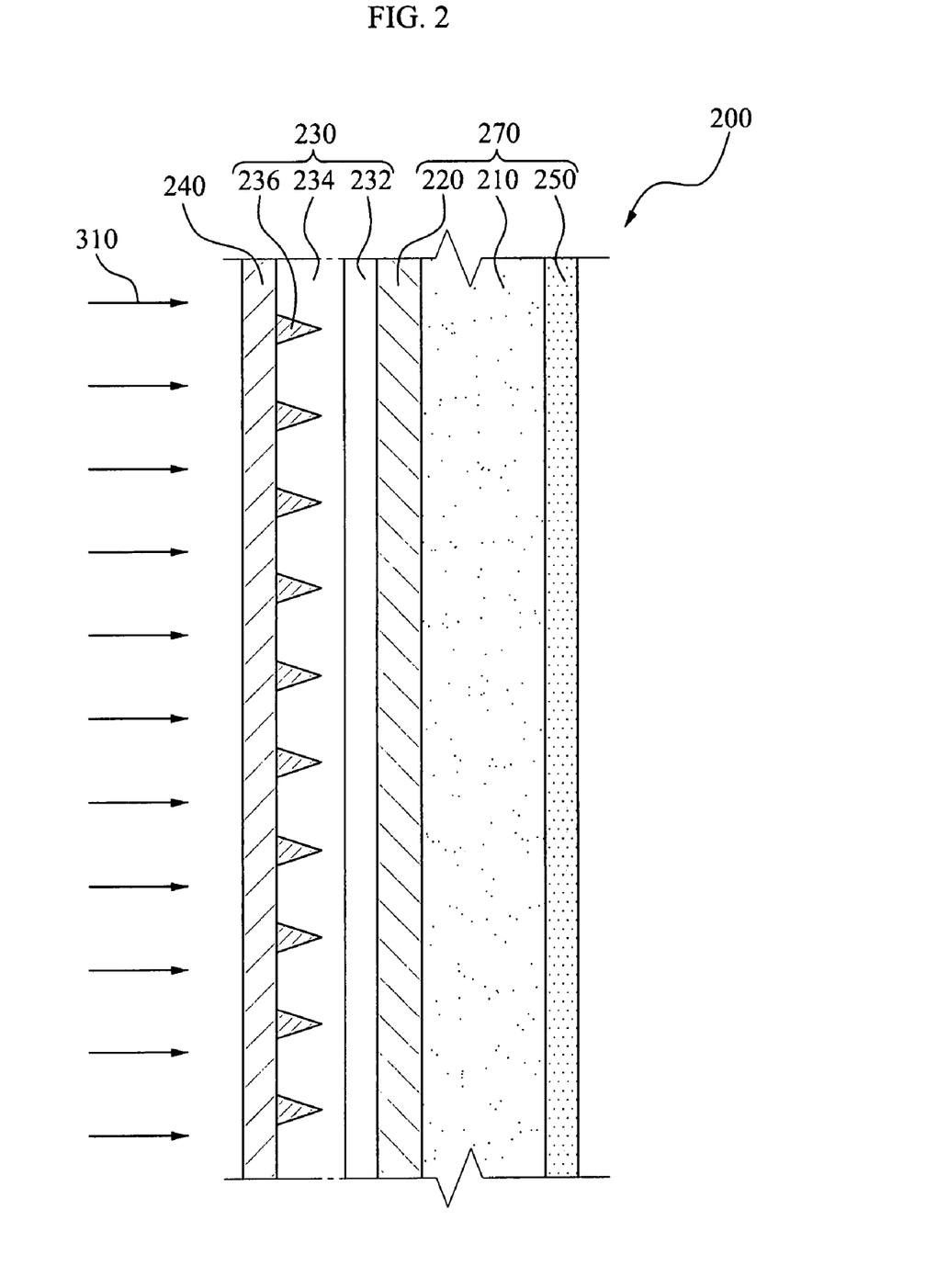
FIG. 2 is a cross-sectional view illustrating a PDP filter according to an exemplary embodiment of the invention.

FIG. 2 is a cross-sectional view illustrating a PDP filter according to an exemplary embodiment of the invention. As illustrated in FIG. 2, the PDP filter 200 according to the present exemplary embodiment includes a filter base 270 and an external light-shielding layer 230. The filter base 270 includes a transparent substrate 210, and layers which have various shielding functions, and the like, and are formed on the transparent substrate 210.

Here, the filter base 270 is formed by stacking the transparent substrate 210, an EM radiation-shielding layer 220, or an antireflective layer 250 regardless of order. Hereinafter, layers corresponding to an EM radiation-shielding function, and an antireflection function are described as separate layers in the present exemplary embodiment, but the present invention is not limited thereto. Specifically, the filter base 270 according to the present exemplary embodiment may include at least one layer, and each layer may have at least one function from the group consisting of the EM radiation-shielding function, and the antireflection function. Also, the filter base 270 may either collectively have the EM radiation-shielding function and the antireflection function, or have merely one function of the EM radiation-shielding function, and the antireflection function.

The external light-shielding layer 230 is disposed on a surface of the filter base 270. The external light-shielding layer 230 of FIG. 2 is disposed on a surface facing towards the panel assembly of the filter base 270, that is, an opposite surface of a viewer position when the PDP filter 200 is installed in the PDP apparatus, but the present invention is not limited thereto, and the external light-shielding layer 230 may be disposed on another surface of the filter base 270.

The external light-shielding layer 230 includes a supporter 232, a base substrate 234 made of a transparent resin formed on a surface of the supporter 232, and at least one external light-shielding part 236 formed on a surface of the base substrate 234 and disposed in such a manner as to be spaced apart from one another in predetermined intervals. The at least one external light-shielding part 236 filled with an external light-absorption material shields the panel assembly from external light entering from the outside.

Here, the base substrate 234 where the light-shielding part 236 is formed may be directly formed in the filter base 270, and the base substrate 234 may be combined with the filter base 270 after forming the base substrate 234 on the supporter 232, as illustrated in FIG. 2. The supporter 232 supports the base substrate 234 where the light-shielding part 236 is formed. The base substrate 234 and the surface of the filter base 270 are combined via the supporter 232 in the exemplary embodiment illustrated in FIG. 2, but the present invention is not limited thereto. Specifically, since the supporter 232 has a purpose of supporting the base substrate 234, the base substrate 234 and the filter base 270 may be directly combined when the external light-shielding layer 230 is disposed on another surface of the filter base 270.

In the exemplary embodiment of the present invention, the supporter 232 is preferably a transparent resin film transparent to the ultraviolet light. Polyethylene terephthalate (PET), polycarbonate (PC), polyvinyl chloride (PVC), and the like may be used for a material of the supporter 232. Also, a layer having a characteristic function of a filter such as the antireflective layer 250, a color correction layer 240, the EM radiation-shielding layer 220, and the like may be used for the supporter 232.

The light-shielding part 236 has a wedge-shape in its cross-sectional surface, and is disposed on the surface of the base substrate 234 facing toward the panel assembly (not shown) in such a manner as to be spaced apart from one another at predetermined intervals, and prevents the external light from entering into the panel assembly.

The base substrate 234 is made of an ultraviolet light-curable resin, and the light-shielding part 236 may be filled with external light-absorption materials such as black inorganic/organic materials and a metal which are capable of absorbing light. The external light-absorption material is preferably a carbon black. In particular, since electric conductivity is high, that is, electric resistance is low in the case of using the metal, the electric resistance according to concentration of the metal powder may be controlled when forming the light-shielding part 236 by adding metal powder. Accordingly, the light-shielding part 236 may perform the EM radiation-shielding function. Furthermore, in the case of using a surface-blackened metal or a black metal, the light-shielding part 236 may efficiently perform the external light-shielding function and the EM radiation-shielding function. Also, the ultraviolet light-curable resin including carbon may be used for the light-shielding part 236.

In order to form the external light-shielding part 236 on the base substrate, the base substrate 232 made of the ultraviolet light-curable resin is coated on a surface of the supporter 232, and then the supporter 232 passes between a pair of rolls (not shown) for forming the external light-shielding part. The outer surface of the roll is formed in an opposite shape to the external light-shielding part 236. Specifically, the base substrate 234 coated on the surface of the supporter 232 is a complete mirror image of the shape of the roll, and then the base substrate 234 is irradiated with ultraviolet light to be hardened, thereby forming the base substrate 234 with wedge-shaped grooves formed thereon. Also, ultraviolet light-curable resin including carbon may be supplied to the wedge-shaped grooves formed on the base substrate 234, and then the base substrate 234 is irradiated with ultraviolet light to be hardened, thereby completing the external light-shielding part 236.

The external light-shielding part 236 as described above includes a bottom surface exposed to the outside of the base substrate 234, and a pair of inclined surfaces defining a wedge-shaped groove formed into the base substrate from the bottom surface. The bottom surface is formed on the surface of the base substrate 234 facing toward to a panel assembly. Also, the external light-shielding layer 230 further includes a bead lens arranged on the surface of the base substrate 234, and the external light-shielding part 236 is positioned between the base substrate and the bead lens.

However, formation methods of the external light-shielding part 236 according to the present exemplary embodiment of the invention are not limited to the above-mentioned methods. The external light-shielding part 236 may be formed by a roll formation method, a heat press method of using a thermoplastic resin, an injection formation method in which a thermoplastic or thermo-curable resin is filled into the base substrate 234 in which an opposite shape to the light-shielding part 236 is a complete mirror image, and the like. Also, when the ultraviolet light-curable resin forming the base substrate 234 has the antireflection function, the EM radiation-shielding function, a color calibration function, or any combination thereof, the external light-shielding layer 230 may additionally perform the above functions. The external light-shielding layer 230 according to the present exemplary embodiment of the invention will be described herein in detail with reference to FIG. 3.

Figure 3:
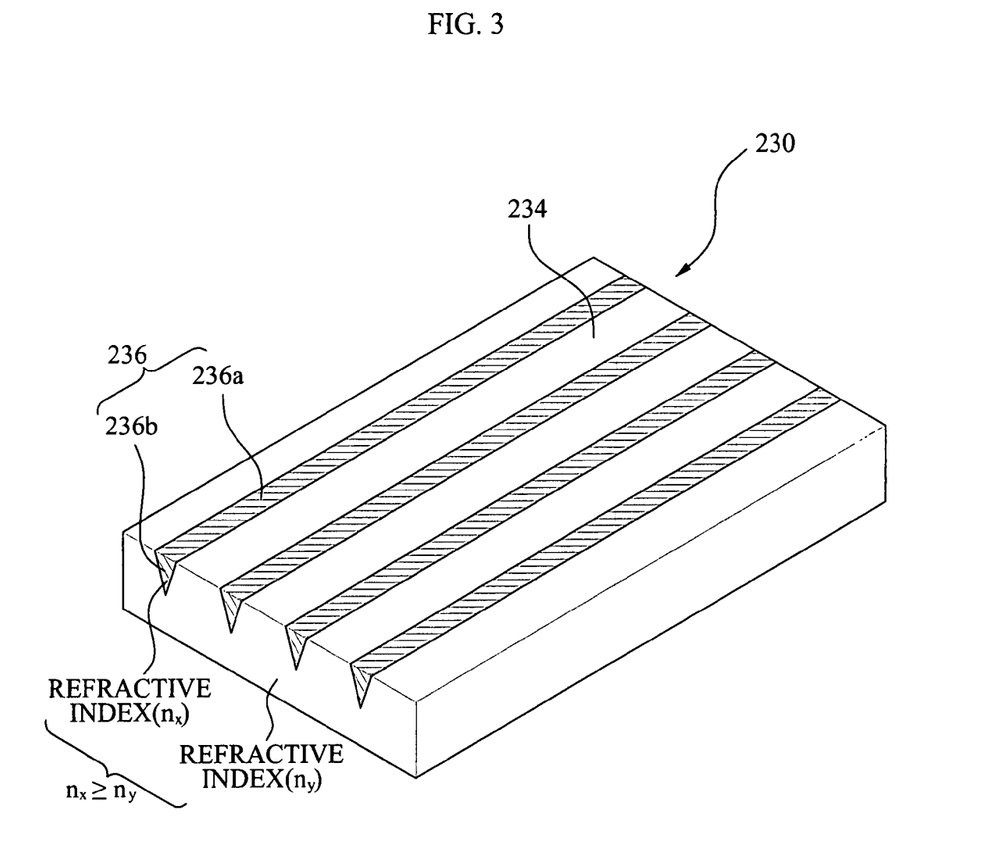
FIG. 3 is a magnified cross-sectional view illustrating an external light-shielding layer of FIG. 2.

FIG. 3 is a magnified cross-sectional view illustrating an external light-shielding layer of FIG. 2. As illustrated in FIG. 3, the external light-shielding layer 230 includes the base substrate 234 made of a transparent resin, and at least one external light-shielding part 236 arranged on a surface of the base substrate 234 in such a manner as to be spaced apart from one another and filled with an external light-absorption material. The external light-shielding part 236 includes a bottom surface 236a exposed to the outside of the base substrate 234, and a pair of inclined surfaces 236b defining a wedge-shaped groove formed into the base substrate 234 from the bottom surface 236a. Here, the inclined surface 236b absorbs external light.

The external light-shielding part 236 is designed such that $n_y$ of a refractive index of the base substrate 234 is less than or equal to $n_x$ of a refractive index of the external light-shielding part 236. As a result, the inclined surface 236b prevents total reflection of external light to prevent occurrence of ghosting, thereby providing a clear image.

The external light-shielding part 236 is arranged in a transverse direction with respect to a viewer, and corresponds to any one of a wedge-shaped black stripe form, a wedge-shaped black matrix form, a wedge-shaped black wave form, a flat-shaped black stripe form, a flat-shaped black matrix form, and a flat-shaped black wave form. Also, since the external light-shielding part 236 is filled with external light-absorption materials for absorbing light as illustrated in FIG. 3, nearly all of the external light is absorbed in the inclined surface 236b of the external light-shielding layer 230 when the external light does not perpendicularly enter into the external light-shielding layer 230. Here, the external light-shielding part 236 includes the bottom surface 236a exposed to the outside of the base substrate 234, and the inclined surface 236b defining the wedge-shaped groove formed into the base substrate 234 from the bottom surface 236a. The inclined surface 236b absorbs the external light. The external light-shielding part 236 is designed such that $n_y$ of a refractive index of the base substrate 234 is less than or equal to $n_x$ of a refractive index of the external light-shielding part 236. As a result, the inclined surface 236b prevents total reflection of external light to prevent occurrence of ghosting, thereby displaying a clear image. Also, a difference between $n_y$ of the refractive index and $n_x$ of the refractive index of the external light-shielding part 236 is preferably 0.05 or less. A width of the external light-shielding part 236 is preferably 10 to 50 µm.

Referring again to FIG. 2, the filter base 270 is formed by stacking the EM radiation-shielding layer 220 formed on a surface of the transparent substrate 210, and an antireflective layer 250 formed on another surface of the transparent substrate 210 in order. However, the present invention is not limited to the stacked order as described above, and the filter base 270 may be formed by stacking the transparent substrate 210, the EM radiation-shielding layer 220, or the antireflective layer 250 regardless of order.

Also, it is required to cover a display surface with a highly conductive material to shield EM radiation. A multi-layered transparent conductive film stacking a conductive mesh film, a metal thin film, and a transparent thin film having a high refractive index may be used for the EM radiation-shielding layer 220 according to the present exemplary embodiment. In the present exemplary embodiment, the EM radiation-shielding layer 220 is formed on the surface of the transparent substrate 210, that is, a surface facing towards the panel assembly, but the present invention is not limited to the above disposition.

Here, a grounded metal mesh, a synthetic resin, or a mesh of a metal fiber covered with a metal may be generally used for the conductive mesh film. A metal having processability and high electric conductivity, for example, copper, chrome, nickel, silver, molybdenum, tungsten, aluminum, and the like, may be used for the metal configuring the conductive mesh film.

Also, the transparent thin film having the high refractive index such as indium tin oxide (ITO) may be used for the multi-layered transparent conductive film in order to have the EM radiation-shielding effect.

There are a multi-layered thin film alternately stacking the metal thin film such as gold, silver, copper, platinum, and palladium, and the transparent thin film having the high refractive index such as indium oxide, stannic oxide, zinc oxide, and the like as the multi-layered transparent conductive film.

There is an effect that the multi-layered transparent conductive film shields NI radiation, when the multi-layered transparent conductive film stacking the metal thin film and the transparent thin film having the high refractive index is used for the EM radiation-shielding layer 220 according to the present exemplary embodiment. Accordingly, two functions corresponding to an NI radiation-shielding function and the EM radiation-shielding function may be simply performed by the EM radiation-shielding layer 220 without separately forming the NI radiation-shielding layer. Also, the NI radiation-shielding layer described as follows may be separately formed in this case.

When the conductive mesh film is used for the EM radiation-shielding layer 220 in the present exemplary embodiment, a polymeric resin, including a colorant absorbing NI radiation which absorbs a wavelength of a NI radiation range, is used to shield NI radiation emitted from the panel assembly. For example, an organic dye of, various materials such as cyanine, anthraquinone, naphthoquinone, phthalocyanine, naphthalocyanine, dimonium, nickeldithiol, and the like, may be used for the colorant absorbing NI radiation. Since the PDP apparatus emits the strong NI radiation extending over a wide wavelength range, the NI radiation-shielding layer absorbing the NI radiation extending over the wide wavelength range may be used.

When the transparent conductive film is used for the EM radiation-shielding layer 220 according to the present exemplary embodiment of the invention, the EM radiation-shielding function is relatively deteriorated, as compared to the case where the conductive mesh film is used for the EM radiation-shielding layer 220, however, when the EM radiation-shielding function is complemented or strengthened by adding the metal powder to the light-shielding part 236, the EM radiation-shielding function is sufficiently realized with merely the transparent conductive film.

The antireflective layer 250 according to the present exemplary embodiment is formed on the other surface of the transparent substrate 210, but the present invention is not limited to the above built-up sequence. As illustrated in FIG. 2, it is efficient that the antireflective layer 250 is formed in a surface corresponding to a viewer position when the PDP filter 200 is installed in the PDP apparatus, that is, the opposite surface of the panel assembly. The antireflective layer 250 may enhance visibility by reducing reflection of an external light.

Referring again to FIG. 2, the PDP filter 200 according to the present exemplary embodiment may further include the color correction layer 240 having a transmittance of 60% or more at a wavelength of 580 to 600 nm. The color correction layer 240 modifies or corrects color balance by reducing or controlling an amount of a red color (R), a green color (G), and a blue color (B).

When each layer or each film of the PDP filter 200 is adhered together, a transparent gluing agent or adhesive may be used. As a specific material, there are an acrylic adhesive, a silicon adhesive, an urethane adhesive, a polyvinyl butyral adhesive (PMB), an ethylene-vinyl acetate adhesive (EVA), a polyvinyl ether, a saturated amorphous polyester, a melamine resin, and the like.

Also, an extended line from the light-shielding part 236 and a longitudinal side of the base substrate 234 are alternatively disposed in such a manner as to have a predetermined bias angle between the extended line and the longitudinal side so as to prevent the moiré fringe.

Hereinafter, the PDP apparatus using the PDP filter described above will be described with respect to FIGS. 4A and 4B.

Figure 4A:
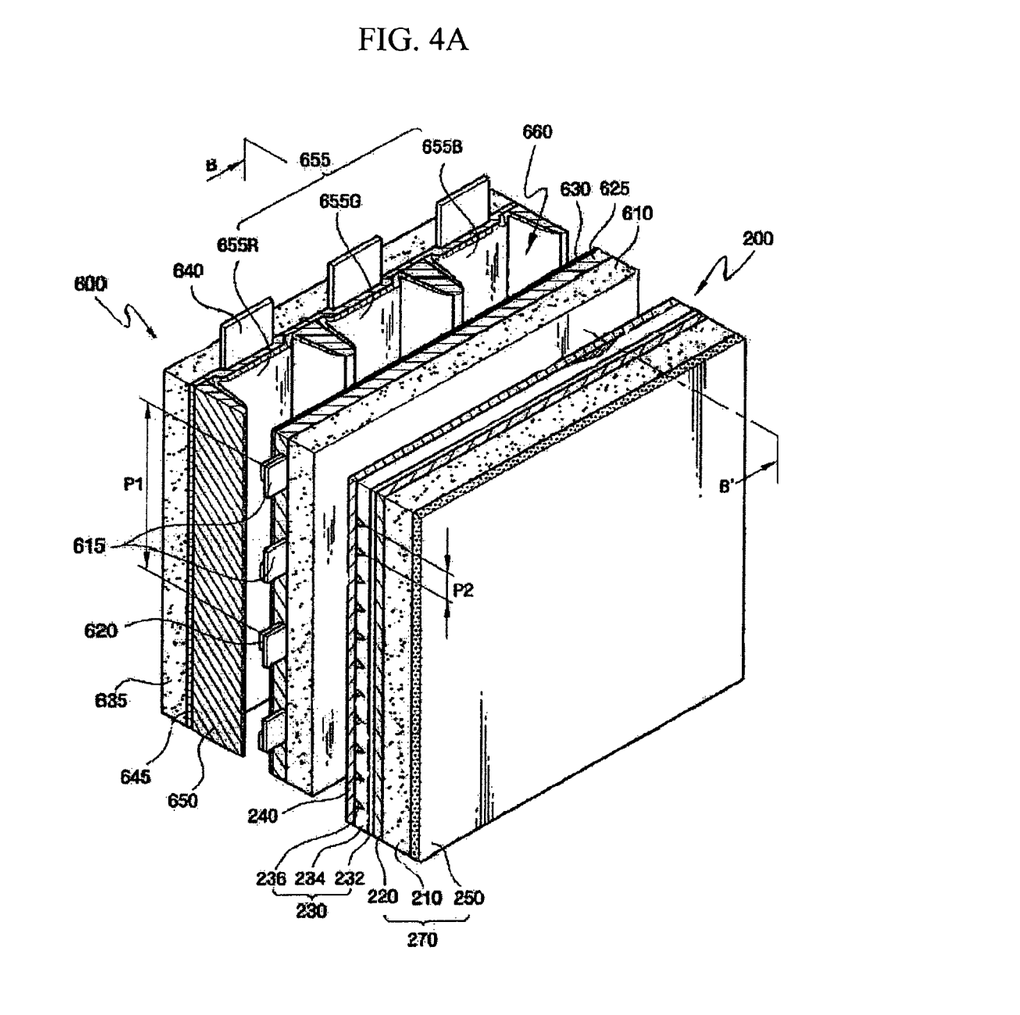
FIG. 4A is an exploded perspective view illustrating a PDP apparatus according to an exemplary embodiment of the invention.
Figure 4B:
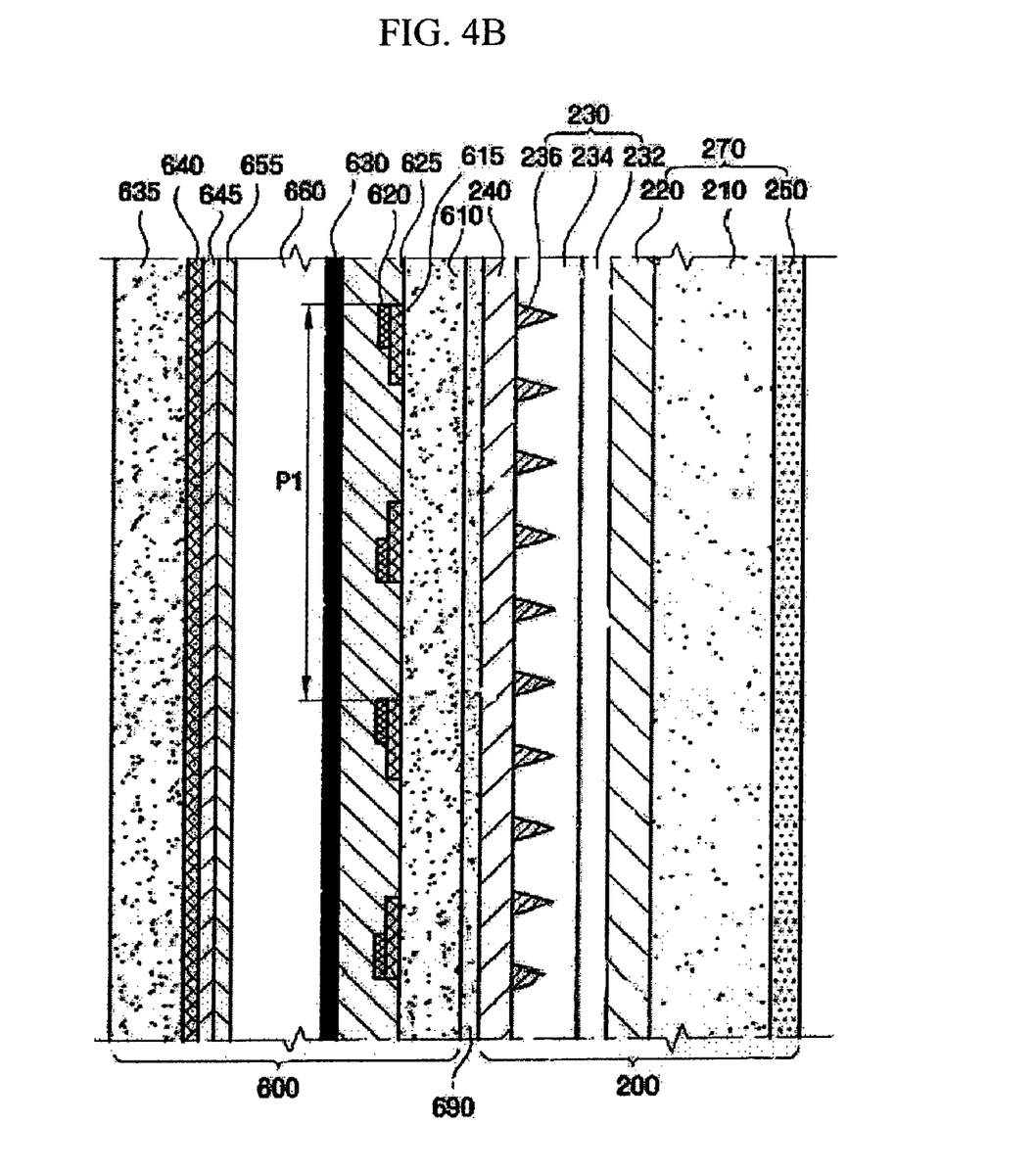
FIG. 4B is a cross-sectional view taken along B-B' line of FIG. 4A.

FIG. 4A is an exploded perspective view illustrating a PDP apparatus according to an exemplary embodiment of the invention; and FIG. 4B is a cross-sectional view taken along B-B' line of FIG. 4A.

As illustrated in FIGS. 4A and 4B, the PDP apparatus according to the present exemplary embodiment of the invention includes a PDP filter 200 and a panel assembly 600. The PDP filter 200 is the same as the PDP filter described above, and the panel assembly 600 will be described hereinafter in detail.

Referring to FIG. 4A, a plurality of sustain electrode pairs 615 are disposed on a surface of a front substrate 610 in a striped pattern. Each of the plurality of sustain electrode 615 includes a bus electrode 620 so as to reduce a signal delay. The sustain electrode pairs 615 are entirely covered with a dielectric layer 625. A dielectric protective layer 630 is formed on the dielectric layer 625. According to the present exemplary embodiment of the invention, the dielectric protective layer 630 is formed by covering the dielectric layer 625 with magnesium oxide (MgO) using a sputtering method. A plurality of address electrodes 640 are formed in a striped pattern on a surface of a rear substrate 635 facing the front substrate 610. The address electrodes 640 are formed to intersect with the sustain electrode pairs 615 so that the front substrate 610 and the rear substrate 635 face each other. The address electrodes 640 are completely covered with a dielectric layer 645. A plurality of partition walls 650 are formed on the dielectric layer 645 in such a way to be parallel to the address electrodes 640 and projected toward the front substrate 610. The partition walls 650 are disposed between address electrodes 640. A phosphor layer 655 is formed on inside surfaces of grooves defined by the partition walls 650 and the dielectric layer 645. The phosphor layer 655 includes a red phosphor layer 655R, a green phosphor layer 655G, and a blue phosphor layer 655B, which are partitioned by the partition walls 650. The red phosphor layer 655R, the green phosphor layer 655G, and the blue phosphor layer 655B are respectively formed using red, green, and blue phosphor particles, and may be formed by a thick film formation method such as a screen printing method, an inkjet method, or a photoresist film method. For example, the red phosphor layer 655R, the green phosphor layer 655G, and the blue phosphor layer 655B may be made of $(Y,Gd)BO_3$:Eu,$Zn_2SiO_4$:Mn, and $BaMgAl_{10}O_{17}$:Eu, respectively.

Discharge cells 660, which are defined by the grooves and the protective layer 630 when the front substrate 610 and the rear substrate 635 are coupled to each other, are filled with a discharge gas. Thus, the sustain electrode pairs 615 of the front substrate 610 and the address electrodes 640 of the rear substrate 635 intersect with each other in the discharge cells 660 of the panel assembly 600. The discharge gas in these discharge cells may be a Ne—Xe mixed gas or a He—Xe mixed gas.

The panel assembly 600 with the above-described structure emits light according to the same principle as a fluorescent lamp. UV light emitted from the discharge gas of the discharge cells 660 excites the phosphor layer 655 to emit visible light. However, the phosphor layers 655R, 655G, and 655B used in the panel assembly 600 are made of phosphor materials having different visible light conversion efficiencies. Thus, a color balance adjustment for image display in the panel assembly 600 is generally performed by adjusting the brightness of the phosphor layers 655R, 655G, and 655B, respectively. In detail, based on the phosphor layer with the lowest brightness, the brightness of the other phosphor layers is lowered in accordance with a predetermined ratio.

The driving of the panel assembly 600 is generally classified into driving for address discharge and sustain discharge.

1 except for the refractive index of the external light-shielding part 236.

TABLE 1

|  | Example 1 | Example 2 | Comparative example 1 | Comparative example 2 | Comparative example 3 |
| --- | --- | --- | --- | --- | --- |
| Refractive index of base substrate | 1.56 | 1.56 | 1.56 | 1.56 | 1.56 |
| Refractive index of external light-shielding part | 1.56 | 1.60 | 1.55 | 1.54 | 1.45 |
| Contrast ratio in a bright room | 274.8 | 267.44 | 278 | 280 | 312 |
| Transmittance | 63 | 63 | 70 | 73 | 74 |
| Occurrence of ghosting | x | x | Δ | ○ | ○ |

The address discharge occurs between the address electrodes 640 and one electrode of the sustain electrode pairs 615. At the same time, wall charges are generated. The sustain discharge occurs due to a potential difference between sustain electrode pairs 615 positioned in the discharge cells 660 in which wall charges are generated. During the sustain discharge, the phosphor layer 655 of the discharge cells 660 in which wall charges are generated is excited by UV light emitted from the discharge gas, and the phosphor layer 655 emits visible light. This visible light creates visually recognizable images through the front substrate 610 while the phosphor layer 655 is being excited.

The relationship between the panel assembly 600 and the PDP filter will now be described with reference to FIG. 4B Referring to FIG. 4B, the PDP filter 200 is separated from an upper surface of the front substrate 610. Also, the PDP filter 200 may be in close contact with the upper surface of the front substrate 610. As illustrated in FIG. 4B, the PDP filter 200 may be adhered to the front substrate 610 using a gluing agent or adhesive 690 in order to prevent foreign substances from entering between the panel assembly 600 and the PDP filter 200, and reinforce strength of the PDP filter 200 itself.

The external light-shielding layer 230 is disposed on a surface of the PDP filter 200 preventing external light from entering into the panel assembly 600. The external light is mainly absorbed in the external light-shielding layer 230, thereby preventing external light from passing through the front substrate 610 and then being reflected. As a result, a contrast ratio of the PDP apparatus in a bright room is enhanced. It is preferable that a pitch P2 of the external light-shielding part 236 is less than a pitch P1 of the discharge cells 660 (or pixel) of the panel assembly 600. Specifically, the plurality of external light-shielding parts 236 are arranged in a unit cell of the discharge cells 660, thereby evenly dispersing incident light, and effectively absorbing the external light.

Under different refractive indexes of the base substrate and the wedge-shaped external light-shielding part of the external light-shielding layer, a contrast ratio in a bright room, transmittance, and occurrence of ghosting were measured, and the results are shown in Table 1 below.

In Example 1, a bottom surface and a pitch of the external light-shielding part 236 were 32 μm and 107.5 μm, respectively. Here, each refractive index of the external light-shielding part 236 and the base substrate 234 was 1.56 and 1.56, and thus, forming the external light-shielding layer 230. In Example 2, Comparative Example 1, Comparative Example 2, and Comparative Example 3, the external light-shielding layer 230 was formed in the same manner as that of Example As can be seen in Table 1, as the refractive index of the external light-shielding part was lowered, the transmittance was increased when comparing Examples 1 and 2 with other Comparative Examples, however, occurrence of ghosting was created, which is unacceptable for the external light-shielding layer. Conversely, when the refractive index of the external light-shielding part was either equal to or more than that of the base substrate in Example 1 and Example 2, the transmittance was reduced, however, occurrence of ghosting was not created, thereby displaying a highly clear image.

As described above, according to the present invention, there is a provided an external light-shielding layer for a display filter in which a refractive index of a base substrate is less than that of an external light-shielding part so that total reflection of light emitted from a display is prevented, thereby preventing occurrence of ghosting, and a display filter and display apparatus including the external light-shielding layer.

According to the present invention, there is provided an external light-shielding layer for a display filter which prevents lowering of picture quality caused by external light while preventing lowering brightness of an image display, and a display filter and display apparatus including the external light-shielding layer.

According to the present invention, there is provided a filter for a display apparatus in which brightness and a contrast ratio in the bright room condition are improved by improving a structure of a PDP filter.

According to the present invention, there is provided a display apparatus including the display filter as described above.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An external light-shielding layer for a display filter, comprising:
   a base substrate made of a transparent resin; and
   at least one external light-shielding part arranged on a surface of the base substrate and filled with an external light-absorption material,
   wherein $n_y$ of a refractive index of the base substrate is less than or equal to $n_x$ of a refractive index of the external light-shielding part.

2. The external light-shielding layer of claim 1, wherein the external light-shielding part comprises:
a bottom surface exposed to the outside of the base substrate, the bottom surface being formed on the surface of the base substrate and facing toward a panel assembly; and
a pair of inclined surfaces defining a wedge-shaped groove formed into the base substrate from the bottom surface.

3. The external light-shielding layer of claim 1, wherein the external shielding part is arranged in a transverse direction with respect to a viewer.

4. The external light-shielding layer of claim 1, wherein the external shielding part corresponds to any one of a wedge-shaped black stripe form, a wedge-shaped black matrix form, a wedge-shaped black wave form, a flat-shaped black stripe form, a flat-shaped black matrix form, and a flat-shaped black wave form.

5. The external light-shielding layer of claim 1, wherein a difference between $n_x$ of the refractive index of the external light-shielding part and $n_y$ of the refractive index of the base substrate is less than 0.05.

6. The external light-shielding layer of claim 1, wherein a width of the external light-shielding part formed in the surface of the base substrate is 10 to 50 μm.

7. The external light-shielding layer of claim 2, further comprising a bead lens arranged on the surface of the base substrate,
wherein the external light-shielding part is positioned between the base substrate and the bead lens.

8. The external light-shielding layer of claim 1, wherein the external light-absorption material consists of a black inorganic material, a black organic material, and a metal.

9. The external light-shielding layer of claim 8, wherein the external light-absorption material is a carbon black.

10. A filter for a display apparatus, comprising:
a filter base; and
an external light-shielding layer formed on a surface of the filter base, and including a base substrate made of a transparent resin and at least one external light-shielding part arranged on a surface of the base substrate,
wherein $n_y$ of a refractive index of the base substrate is less than or equal to $n_x$ of a refractive index of the external light-shielding part.

11. The filter of claim 10, wherein the external light-shielding part comprises:
a bottom surface exposed to the outside of the base substrate, the bottom surface being formed on the surface of the base substrate and facing toward a panel assembly; and
a pair of inclined surfaces defining a wedge-shaped groove formed into the base substrate from the bottom surface.

12. A display apparatus, comprising:
a panel assembly including a transparent front substrate and a transparent rear substrate, and at least one cell between the front substrate and the rear substrate, the front substrate and the rear substrate being combined faced together;
an external light-shielding layer for the display filter of claim 1 being attached to the front substrate; and
a filter disposed opposite to the external light-shielding layer.

13. A display apparatus, comprising:
a panel assembly including a transparent front substrate and a transparent rear substrate, and at least one cell between the front substrate and the rear substrate, the front substrate and the rear substrate being combined faced together; and
a filter for the display apparatus of claim 12, the filter being disposed opposite to the front substrate.

14. The display apparatus of claim 13, wherein the display apparatus is any one of a large-sized display apparatus corresponding to one selected from among a Plasma Display Panel (PDP) apparatus, an Organic Light Emitting Diode (OLED) apparatus, a Liquid Crystal Display (LCD) apparatus, and a Field Emission Display (FED) apparatus, a small-sized mobile display apparatus corresponding to any one of a display window of a small-sized game device and a display window of a mobile phone, and a flexible display apparatus.

* * * * *